(12) United States Patent
Sampsell

(10) Patent No.: US 7,532,195 B2
(45) Date of Patent: May 12, 2009

(54) METHOD AND SYSTEM FOR REDUCING POWER CONSUMPTION IN A DISPLAY

(75) Inventor: Jeffrey B. Sampsell, San Jose, CA (US)

(73) Assignee: IDC, LLC, San Francisco, CA (US)

( * ) Notice: Subject to any disclaimer, the term of this patent is extended or adjusted under 35 U.S.C. 154(b) by 532 days.

(21) Appl. No.: 11/097,827

(22) Filed: Apr. 1, 2005

(65) Prior Publication Data

US 2006/0066597 A1    Mar. 30, 2006

Related U.S. Application Data

(60) Provisional application No. 60/613,404, filed on Sep. 27, 2004.

(51) Int. Cl.
*G09G 3/34* (2006.01)
(52) U.S. Cl. .................... 345/108; 345/698
(58) Field of Classification Search ........... 345/204, 345/698, 699, 87, 76, 108; 359/245
See application file for complete search history.

(56) References Cited

U.S. PATENT DOCUMENTS

| | | |
|---|---|---|
| 3,982,239 A | 9/1976 | Sherr |
| 4,403,248 A | 9/1983 | te Velde |
| 4,441,791 A | 4/1984 | Hornbeck |
| 4,459,182 A | 7/1984 | te Velde |
| 4,482,213 A | 11/1984 | Piliavin et al. |
| 4,500,171 A | 2/1985 | Penz et al. |
| 4,519,676 A | 5/1985 | te Velde |
| 4,566,935 A | 1/1986 | Hornbeck |
| 4,571,603 A | 2/1986 | Hornbeck et al. |
| 4,596,992 A | 6/1986 | Hornbeck |
| 4,615,595 A | 10/1986 | Hornbeck |

(Continued)

FOREIGN PATENT DOCUMENTS

EP    0295802 A    12/1988

(Continued)

OTHER PUBLICATIONS

Chen et al., Low peak current driving scheme for passive matrix-OLED, SID International Symposium Digest of Technical Papers, May 2003, pp. 504-507.

(Continued)

*Primary Examiner*—Richard Hjerpe
*Assistant Examiner*—Stephen G Sherman
(74) *Attorney, Agent, or Firm*—Knobbe, Martens, Olson & Bear, LLC

(57) ABSTRACT

A method and system for reducing power consumption in a display includes driving a display comprising a plurality of display elements characterized by a display state. In a first mode of operation, the display state of substantially all the display elements is periodically re-set so as to display a first series of image frames. Upon changing to a second mode of operation, a second mode of operations comprises re-setting the display state of only a portion of the display elements so as to display a second series of image frames at a display element resolution which is less than said display element resolution used to display said first series of image frames.

13 Claims, 6 Drawing Sheets

U.S. PATENT DOCUMENTS

| | | |
|---|---|---|
| 4,662,746 A | 5/1987 | Hornbeck |
| 4,681,403 A | 7/1987 | te Velde et al. |
| 4,709,995 A | 12/1987 | Kuribayashi et al. |
| 4,710,732 A | 12/1987 | Hornbeck |
| 4,856,863 A | 8/1989 | Sampsell et al. |
| 4,859,060 A | 8/1989 | Katagiri et al. |
| 4,954,789 A | 9/1990 | Sampsell |
| 4,956,619 A | 9/1990 | Hornbeck |
| 4,982,184 A | 1/1991 | Kirkwood |
| 5,018,256 A | 5/1991 | Hornbeck |
| 5,028,939 A | 7/1991 | Hornbeck et al. |
| 5,037,173 A | 8/1991 | Sampsell et al. |
| 5,055,833 A | 10/1991 | Hehlen et al. |
| 5,061,049 A | 10/1991 | Hornbeck |
| 5,078,479 A | 1/1992 | Vuilleumier |
| 5,079,544 A | 1/1992 | DeMond et al. |
| 5,083,857 A | 1/1992 | Hornbeck |
| 5,096,279 A | 3/1992 | Hornbeck et al. |
| 5,099,353 A | 3/1992 | Hornbeck |
| 5,124,834 A | 6/1992 | Cusano et al. |
| 5,142,405 A | 8/1992 | Hornbeck |
| 5,142,414 A | 8/1992 | Koehler et al. |
| 5,162,787 A | 11/1992 | Thompson et al. |
| 5,168,406 A | 12/1992 | Nelson |
| 5,170,156 A | 12/1992 | DeMond et al. |
| 5,172,262 A | 12/1992 | Hornbeck |
| 5,179,274 A | 1/1993 | Sampsell |
| 5,192,395 A | 3/1993 | Boysel et al. |
| 5,192,946 A | 3/1993 | Thompson et al. |
| 5,206,629 A | 4/1993 | DeMond et al. |
| 5,212,582 A | 5/1993 | Nelson |
| 5,214,419 A | 5/1993 | DeMond et al. |
| 5,214,420 A | 5/1993 | Thompson et al. |
| 5,216,537 A | 6/1993 | Hornbeck |
| 5,226,099 A | 7/1993 | Mignardi et al. |
| 5,227,900 A | 7/1993 | Inaba et al. |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,254,980 A | 10/1993 | Hendrix et al. |
| 5,272,473 A | 12/1993 | Thompson et al. |
| 5,278,652 A | 1/1994 | Urbanus et al. |
| 5,280,277 A | 1/1994 | Hornbeck |
| 5,287,096 A | 2/1994 | Thompson et al. |
| 5,287,215 A | 2/1994 | Warde et al. |
| 5,296,950 A | 3/1994 | Lin et al. |
| 5,305,640 A | 4/1994 | Boysel et al. |
| 5,312,513 A | 5/1994 | Florence et al. |
| 5,323,002 A | 6/1994 | Sampsell et al. |
| 5,325,116 A | 6/1994 | Sampsell |
| 5,327,286 A | 7/1994 | Sampsell et al. |
| 5,331,454 A | 7/1994 | Hornbeck |
| 5,339,116 A | 8/1994 | Urbanus et al. |
| 5,365,283 A | 11/1994 | Doherty et al. |
| 5,411,769 A | 5/1995 | Hornbeck |
| 5,444,566 A | 8/1995 | Gale et al. |
| 5,446,479 A | 8/1995 | Thompson et al. |
| 5,448,314 A | 9/1995 | Heimbuch et al. |
| 5,452,024 A | 9/1995 | Sampsell |
| 5,454,906 A | 10/1995 | Baker et al. |
| 5,457,493 A | 10/1995 | Leddy et al. |
| 5,457,566 A | 10/1995 | Sampsell et al. |
| 5,459,602 A | 10/1995 | Sampsell |
| 5,461,411 A | 10/1995 | Florence et al. |
| 5,488,505 A | 1/1996 | Engle |
| 5,489,952 A | 2/1996 | Gove et al. |
| 5,497,172 A | 3/1996 | Doherty et al. |
| 5,497,197 A | 3/1996 | Gove et al. |
| 5,499,062 A | 3/1996 | Urbanus |
| 5,506,597 A | 4/1996 | Thompson et al. |
| 5,515,076 A | 5/1996 | Thompson et al. |
| 5,517,347 A | 5/1996 | Sampsell |
| 5,523,803 A | 6/1996 | Urbanus et al. |
| 5,526,051 A | 6/1996 | Gove et al. |
| 5,526,172 A | 6/1996 | Kanack |
| 5,526,688 A | 6/1996 | Boysel et al. |
| 5,535,047 A | 7/1996 | Hornbeck |
| 5,548,301 A | 8/1996 | Kornher et al. |
| 5,551,293 A | 9/1996 | Boysel et al. |
| 5,552,924 A | 9/1996 | Tregilgas |
| 5,552,925 A | 9/1996 | Worley |
| 5,563,398 A | 10/1996 | Sampsell |
| 5,567,334 A | 10/1996 | Baker et al. |
| 5,570,135 A | 10/1996 | Gove et al. |
| 5,578,976 A | 11/1996 | Yao |
| 5,581,272 A | 12/1996 | Conner et al. |
| 5,583,688 A | 12/1996 | Hornbeck |
| 5,589,852 A | 12/1996 | Thompson et al. |
| 5,597,736 A | 1/1997 | Sampsell |
| 5,598,565 A | 1/1997 | Reinhardt |
| 5,600,383 A | 2/1997 | Hornbeck |
| 5,602,671 A | 2/1997 | Hornbeck |
| 5,606,441 A | 2/1997 | Florence et al. |
| 5,608,468 A | 3/1997 | Gove et al. |
| 5,610,438 A | 3/1997 | Wallace et al. |
| 5,610,624 A | 3/1997 | Bhuva |
| 5,610,625 A | 3/1997 | Sampsell |
| 5,612,713 A | 3/1997 | Bhuva et al. |
| 5,619,061 A | 4/1997 | Goldsmith et al. |
| 5,619,365 A | 4/1997 | Rhoades et al. |
| 5,619,366 A | 4/1997 | Rhoads et al. |
| 5,629,790 A | 5/1997 | Neukermans et al. |
| 5,633,652 A | 5/1997 | Kanbe et al. |
| 5,636,052 A | 6/1997 | Arney et al. |
| 5,638,084 A | 6/1997 | Kalt |
| 5,638,946 A | 6/1997 | Zavracky |
| 5,646,768 A | 7/1997 | Kaeiyama |
| 5,650,881 A | 7/1997 | Hornbeck |
| 5,654,741 A | 8/1997 | Sampsell et al. |
| 5,657,099 A | 8/1997 | Doherty et al. |
| 5,659,374 A | 8/1997 | Gale, Jr. et al. |
| 5,665,997 A | 9/1997 | Weaver et al. |
| 5,726,675 A * | 3/1998 | Inoue ......................... 345/97 |
| 5,745,193 A | 4/1998 | Urbanus et al. |
| 5,745,281 A | 4/1998 | Yi et al. |
| 5,754,160 A | 5/1998 | Shimizu et al. |
| 5,771,116 A | 6/1998 | Miller et al. |
| 5,784,189 A | 7/1998 | Bozler et al. |
| 5,784,212 A | 7/1998 | Hornbeck |
| 5,808,780 A | 9/1998 | McDonald |
| 5,818,095 A | 10/1998 | Sampsell |
| 5,828,367 A * | 10/1998 | Kuga ......................... 345/211 |
| 5,835,255 A | 11/1998 | Miles |
| 5,842,088 A | 11/1998 | Thompson |
| 5,867,302 A | 2/1999 | Fleming et al. |
| 5,912,758 A | 6/1999 | Knipe et al. |
| 5,929,831 A * | 7/1999 | Aratani et al. ............. 345/97 |
| 5,943,158 A | 8/1999 | Ford et al. |
| 5,959,763 A | 9/1999 | Bozler et al. |
| 5,966,235 A | 10/1999 | Walker et al. |
| 5,986,796 A | 11/1999 | Miles |
| 6,028,690 A | 2/2000 | Carter et al. |
| 6,038,056 A | 3/2000 | Florence et al. |
| 6,040,937 A | 3/2000 | Miles |
| 6,049,317 A | 4/2000 | Thompson et al. |
| 6,055,090 A | 4/2000 | Miles |
| 6,061,075 A | 5/2000 | Nelson et al. |
| 6,099,132 A | 8/2000 | Kaeriyama |
| 6,100,872 A | 8/2000 | Aratani et al. |
| 6,113,239 A | 9/2000 | Sampsell et al. |
| 6,147,790 A | 11/2000 | Meier et al. |
| 6,160,833 A | 12/2000 | Floyd et al. |
| 6,180,428 B1 | 1/2001 | Peeters et al. |

| | | |
|---|---|---|
| 6,201,633 B1 | 3/2001 | Peeters et al. |
| 6,232,936 B1 | 5/2001 | Gove et al. |
| 6,275,326 B1 | 8/2001 | Bhalla et al. |
| 6,282,010 B1 | 8/2001 | Sulzbach et al. |
| 6,295,154 B1 | 9/2001 | Laor et al. |
| 6,304,297 B1 | 10/2001 | Swan |
| 6,323,982 B1 | 11/2001 | Hornbeck |
| 6,327,071 B1 | 12/2001 | Kimura |
| 6,356,085 B1 | 3/2002 | Ryat et al. |
| 6,356,254 B1 | 3/2002 | Kimura |
| 6,429,601 B1 | 8/2002 | Friend et al. |
| 6,433,917 B1 | 8/2002 | Mei et al. |
| 6,447,126 B1 | 9/2002 | Hornbeck |
| 6,465,355 B1 | 10/2002 | Horsley |
| 6,466,358 B2 | 10/2002 | Tew |
| 6,473,274 B1 | 10/2002 | Maimone et al. |
| 6,480,177 B2 | 11/2002 | Doherty et al. |
| 6,496,122 B2 | 12/2002 | Sampsell |
| 6,501,107 B1 | 12/2002 | Sinclair et al. |
| 6,507,330 B1 | 1/2003 | Handschy et al. |
| 6,507,331 B1 | 1/2003 | Schlangen et al. |
| 6,545,335 B1 | 4/2003 | Chua et al. |
| 6,548,908 B2 | 4/2003 | Chua et al. |
| 6,549,338 B1 | 4/2003 | Wolverton et al. |
| 6,552,840 B2 | 4/2003 | Knipe |
| 6,574,033 B1 | 6/2003 | Chui et al. |
| 6,589,625 B1 | 7/2003 | Kothari et al. |
| 6,593,934 B1 | 7/2003 | Liaw et al. |
| 6,600,201 B2 | 7/2003 | Hartwell et al. |
| 6,606,175 B1 | 8/2003 | Sampsell et al. |
| 6,625,047 B2 | 9/2003 | Coleman, Jr. |
| 6,630,786 B2 | 10/2003 | Cummings et al. |
| 6,632,698 B2 | 10/2003 | Ives |
| 6,636,187 B2 | 10/2003 | Tajima et al. |
| 6,643,069 B2 | 11/2003 | Dewald |
| 6,650,455 B2 | 11/2003 | Miles |
| 6,666,561 B1 | 12/2003 | Blakley |
| 6,674,090 B1 | 1/2004 | Chua et al. |
| 6,674,562 B1 | 1/2004 | Miles |
| 6,680,792 B2 | 1/2004 | Miles |
| 6,710,908 B2 | 3/2004 | Miles et al. |
| 6,741,377 B2 | 5/2004 | Miles |
| 6,741,384 B1 | 5/2004 | Martin et al. |
| 6,741,503 B1 | 5/2004 | Farris et al. |
| 6,747,785 B2 | 6/2004 | Chen et al. |
| 6,762,873 B1 | 7/2004 | Coker et al. |
| 6,775,174 B2 | 8/2004 | Huffman et al. |
| 6,778,155 B2 | 8/2004 | Doherty et al. |
| 6,781,643 B1 | 8/2004 | Watanabe et al. |
| 6,787,384 B2 | 9/2004 | Okumura |
| 6,787,438 B1 | 9/2004 | Nelson |
| 6,788,520 B1 | 9/2004 | Behin et al. |
| 6,794,119 B2 | 9/2004 | Miles |
| 6,811,267 B1 | 11/2004 | Allen et al. |
| 6,813,060 B1 | 11/2004 | Garcia et al. |
| 6,819,469 B1 | 11/2004 | Koba |
| 6,822,628 B2 | 11/2004 | Dunphy et al. |
| 6,829,132 B2 | 12/2004 | Martin et al. |
| 6,853,129 B1 | 2/2005 | Cummings et al. |
| 6,855,610 B2 | 2/2005 | Tung et al. |
| 6,859,218 B1 | 2/2005 | Luman et al. |
| 6,861,277 B1 | 3/2005 | Monroe et al. |
| 6,862,022 B2 | 3/2005 | Slupe |
| 6,862,029 B1 | 3/2005 | D'Souza et al. |
| 6,867,896 B2 | 3/2005 | Miles |
| 6,870,581 B2 | 3/2005 | Li et al. |
| 6,903,860 B2 | 6/2005 | Ishii |
| 7,034,783 B2 | 4/2006 | Gates et al. |
| 7,057,610 B2 * | 6/2006 | Kataoka et al. ............. 345/211 |
| 7,123,216 B1 | 10/2006 | Miles |
| 7,161,728 B2 | 1/2007 | Sampsell et al. |
| 2001/0003487 A1 | 6/2001 | Miles |
| 2001/0026250 A1 | 10/2001 | Inoue et al. |
| 2001/0034075 A1 | 10/2001 | Onoya |
| 2001/0043171 A1 | 11/2001 | Van Gorkom et al. |
| 2001/0046081 A1 | 11/2001 | Hayashi et al. |
| 2001/0051014 A1 | 12/2001 | Behin et al. |
| 2002/0000959 A1 | 1/2002 | Colgan et al. |
| 2002/0005827 A1 | 1/2002 | Kobayashi |
| 2002/0012159 A1 | 1/2002 | Tew |
| 2002/0015215 A1 | 2/2002 | Miles |
| 2002/0024711 A1 | 2/2002 | Miles |
| 2002/0036304 A1 | 3/2002 | Ehmke et al. |
| 2002/0050882 A1 | 5/2002 | Hyman et al. |
| 2002/0054424 A1 | 5/2002 | Miles et al. |
| 2002/0075226 A1 | 6/2002 | Lippincott |
| 2002/0075555 A1 | 6/2002 | Miles |
| 2002/0093722 A1 | 7/2002 | Chan et al. |
| 2002/0097133 A1 | 7/2002 | Charvet et al. |
| 2002/0126364 A1 | 9/2002 | Miles |
| 2002/0179421 A1 | 12/2002 | Williams et al. |
| 2002/0186108 A1 | 12/2002 | Hallbjorner |
| 2002/0190940 A1 * | 12/2002 | Itoh et al. ..................... 345/87 |
| 2003/0004272 A1 | 1/2003 | Power |
| 2003/0043157 A1 | 3/2003 | Miles |
| 2003/0072070 A1 | 4/2003 | Miles |
| 2003/0122773 A1 | 7/2003 | Washio et al. |
| 2003/0137215 A1 | 7/2003 | Cabuz |
| 2003/0137521 A1 | 7/2003 | Zehner et al. |
| 2003/0189536 A1 | 10/2003 | Ruigt |
| 2003/0202264 A1 | 10/2003 | Weber et al. |
| 2003/0202265 A1 | 10/2003 | Reboa et al. |
| 2003/0202266 A1 | 10/2003 | Ring et al. |
| 2004/0008396 A1 | 1/2004 | Stappaerts |
| 2004/0022044 A1 | 2/2004 | Yasuoka et al. |
| 2004/0027701 A1 | 2/2004 | Ishikawa |
| 2004/0051929 A1 | 3/2004 | Sampsell et al. |
| 2004/0058532 A1 | 3/2004 | Miles et al. |
| 2004/0080807 A1 | 4/2004 | Chen et al. |
| 2004/0145049 A1 | 7/2004 | McKinnell et al. |
| 2004/0145553 A1 | 7/2004 | Sala et al. |
| 2004/0147056 A1 | 7/2004 | McKinnell et al. |
| 2004/0160143 A1 | 8/2004 | Shreeve et al. |
| 2004/0174583 A1 | 9/2004 | Chen et al. |
| 2004/0179281 A1 | 9/2004 | Reboa |
| 2004/0212026 A1 | 10/2004 | Van Brocklin et al. |
| 2004/0217378 A1 | 11/2004 | Martin et al. |
| 2004/0217919 A1 | 11/2004 | Pichl et al. |
| 2004/0218251 A1 | 11/2004 | Piehl et al. |
| 2004/0218334 A1 | 11/2004 | Martin et al. |
| 2004/0218341 A1 | 11/2004 | Martin et al. |
| 2004/0223204 A1 | 11/2004 | Mao et al. |
| 2004/0227493 A1 | 11/2004 | Van Brocklin et al. |
| 2004/0240032 A1 | 12/2004 | Miles |
| 2004/0240138 A1 | 12/2004 | Martin et al. |
| 2004/0245588 A1 | 12/2004 | Nikkel et al. |
| 2004/0263944 A1 | 12/2004 | Miles et al. |
| 2005/0001828 A1 | 1/2005 | Martin et al. |
| 2005/0012577 A1 | 1/2005 | Pillans et al. |
| 2005/0024301 A1 * | 2/2005 | Funston ..................... 345/76 |
| 2005/0038950 A1 | 2/2005 | Adelmann |
| 2005/0057442 A1 | 3/2005 | Way |
| 2005/0068583 A1 | 3/2005 | Gutkowski et al. |
| 2005/0069209 A1 | 3/2005 | Damera-Venkata et al. |
| 2005/0116924 A1 | 6/2005 | Sauvante et al. |
| 2005/0206991 A1 | 9/2005 | Chui et al. |
| 2005/0286113 A1 | 12/2005 | Miles |
| 2005/0286114 A1 | 12/2005 | Miles |
| 2006/0044246 A1 | 3/2006 | Mignard |
| 2006/0044298 A1 | 3/2006 | Mignard et al. |
| 2006/0044928 A1 | 3/2006 | Chui et al. |
| 2006/0056000 A1 | 3/2006 | Mignard |
| 2006/0057754 A1 | 3/2006 | Cummings |
| 2006/0066542 A1 | 3/2006 | Chui |
| 2006/0066559 A1 | 3/2006 | Chui et al. |
| 2006/0066560 A1 | 3/2006 | Gally et al. |

| | | | |
|---|---|---|---|
| 2006/0066561 A1 | 3/2006 | Chui et al. | |
| 2006/0066594 A1 | 3/2006 | Tyger | |
| 2006/0066598 A1 | 3/2006 | Floyd | |
| 2006/0066601 A1 | 3/2006 | Kothari | |
| 2006/0066935 A1 | 3/2006 | Cummings et al. | |
| 2006/0066937 A1 | 3/2006 | Chui | |
| 2006/0066938 A1 | 3/2006 | Chui | |
| 2006/0067648 A1 | 3/2006 | Chui et al. | |
| 2006/0067653 A1 | 3/2006 | Gally et al. | |
| 2006/0077127 A1 | 4/2006 | Sampsell et al. | |
| 2006/0077505 A1 | 4/2006 | Chui et al. | |
| 2006/0077520 A1 | 4/2006 | Chui et al. | |
| 2006/0103613 A1 | 5/2006 | Chui | |

FOREIGN PATENT DOCUMENTS

| | | |
|---|---|---|
| EP | 0300754 A2 | 1/1989 |
| EP | 0306308 A2 | 3/1989 |
| EP | 0318050 A | 5/1989 |
| EP | 0 417 523 A | 3/1991 |
| EP | 0 467 048 A | 1/1992 |
| EP | 0570906 A | 11/1993 |
| EP | 0608056 A1 | 7/1994 |
| EP | 0655725 A1 | 5/1995 |
| EP | 0 667 548 A1 | 8/1995 |
| EP | 0 703 562 | 3/1996 |
| EP | 0725380 A1 | 8/1996 |
| EP | 0852371 A1 | 7/1998 |
| EP | 0911794 A1 | 4/1999 |
| EP | 1 017 038 A | 7/2000 |
| EP | 1 146 533 A | 10/2001 |
| EP | 1 239 448 | 9/2002 |
| EP | 1 280 129 | 1/2003 |
| EP | 1343190 A | 9/2003 |
| EP | 1345197 A | 9/2003 |
| EP | 1381023 A | 1/2004 |
| EP | 1 414 011 | 4/2004 |
| EP | 1473691 A2 | 11/2004 |
| GB | 2401200 A | 11/2004 |
| JP | 2004-29571 | 1/2004 |
| WO | WO 95/30924 | 11/1995 |
| WO | WO 97/17628 | 5/1997 |
| WO | WO 99/52006 A3 | 10/1999 |
| WO | WO 01/73937 A | 10/2001 |
| WO | WO 02/089103 | 11/2002 |
| WO | WO 03/007049 A1 | 1/2003 |
| WO | WO 03/015071 A2 | 2/2003 |
| WO | WO 03/044765 A2 | 5/2003 |
| WO | WO 03/060940 A | 7/2003 |
| WO | WO 03/069413 A1 | 8/2003 |
| WO | WO 03/073151 A1 | 9/2003 |
| WO | WO 03/079323 A | 9/2003 |
| WO | WO 03/090199 A1 | 10/2003 |
| WO | WO 2004/006003 A1 | 1/2004 |
| WO | WO 2004/026757 A2 | 4/2004 |
| WO | WO 2004/049034 A1 | 6/2004 |
| WO | WO 2004/054088 | 6/2004 |

OTHER PUBLICATIONS

Seeger et al., "Stabilization of Electrostatically Actuated Mechanical Devices", (1997) International Conference on Solid State Sensors and Actuators; vol. 2, pp. 1133-1136.
Miles, MEMS-based interferometric modulator for display applications, Part of the SPIE Conference on Micromachined Devices and Components, vol. 3876, pp. 20-28 (1999).
Miles et al., 5.3: Digital Paper™: Reflective displays using interferometric modulation, SID Digest, vol. XXXI, 2000 pp. 32-35.
Peroulis et al., Low contact resistance series MEMS switches, 2002, pp. 223-226, vol. 1, IEEE MTT-S International Microwave Symposium Digest, New York, NY.
Bains, "Digital Paper Display Technology holds Promise for Portables", CommsDesign EE Times (2000).
Lieberman, "MEMS Display Looks to give PDAs Sharper Image" EE Times (2004).
Lieberman, "Microbridges at heart of new MEMS displays" EE Times (2004).
Miles, "Interferometric Modulation: MOEMS as an Enabling Technology for High-Performance Reflective Displays," Proceedings of the International Society for Optical Engineering, San Jose, CA, vol. 49085, pp. 131-139 (Jan. 28, 2003).
Partial European Search Report for App. No. 05255664.4, dated May 7, 2008.
Office Action in Chinese App. No. 2005101050475, received Jul. 4, 2008.
Extended European Search Report for App. No. 05255664.4, dated Aug. 11, 2008.
Official Action dated May 15, 2008 in Mexican App. No. 5010239.
Office Action in Chinese App. No. 2005101050475, received Dec. 4, 2008.

* cited by examiner

|  | Column Output Signals | |
|---|---|---|
|  | + $V_{bias}$ | - $V_{bias}$ |
| Row Output Signals  0 | Stable | Stable |
| + $\Delta V$ | Release | Actuate |
| − $\Delta V$ | Actuate | Release |

METHOD AND SYSTEM FOR REDUCING POWER CONSUMPTION IN A DISPLAY

RELATED APPLICATIONS

This application claims the benefit of, and incorporates by reference in its entirety, U.S. Provisional Application No. 60/613,404 filed Sep. 27, 2004.

BACKGROUND

Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. An interferometric modulator may comprise a pair of conductive plates, one or both of which may be transparent and/or reflective in whole or part and capable of relative motion upon application of an appropriate electrical signal. One plate may comprise a stationary layer deposited on a substrate, the other plate may comprise a metallic membrane separated from the stationary layer by an air gap. Such devices have a wide range of applications, and it would be beneficial in the art to utilize and/or modify the characteristics of these types of devices so that their features can be exploited in improving existing products and creating new products that have not yet been developed.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Preferred Embodiments" one will understand how the features of this invention provide advantages over other display devices.

One embodiment is a method of updating a display. The display includes a plurality of display elements characterized by a display state. The method includes, in a first mode of operation, periodically re-setting the display state of substantially all the display elements at a first frame update rate so as to display a first series of image frames. The method further includes changing to a second mode of operation. The second mode of operation comprises periodically re-setting the display state of only a portion of the display elements at a second frame update rate so as to display a second series of image frames at a display element resolution which is less than the display element resolution used to display the first series of image frames. The method further includes periodically re-setting said display state of a remaining portion of said display elements at a third rate that is less than said second frame update rate.

Another embodiment includes a system for displaying image data. The system includes a display device having a plurality of operational modes, at least some of the operational modes corresponding to reduced display element resolution when displaying image data on a display. The system further includes a source of image data configured to provide image data to said display device at a data rate that depends at least in part on which of the plurality of operational modes the display device is operating.

Another embodiment is a method of updating a display. The method includes applying a series of row voltage strobes to a first set of rows of display elements during a display write operation so as to configure display elements in said first set of rows to a selected state. The method further includes skipping subsequent row voltage strobes to said first set of rows during subsequent display write operations that configure the remaining rows of the display in accordance with received display data.

Another embodiment is a method of updating a display. The method includes applying a set of column voltages to a first set of columns of display elements during a display write operation so as to configure display elements in said first set of columns to a selected state. The method further includes skipping subsequent column transitions to said first set of columns during subsequent display write operations that configure the remaining columns of the display in accordance with received display data.

DETAILED DESCRIPTION OF PREFERRED EMBODIMENTS

One embodiment is a method of driving a display so as to reduce power consumption of the display that includes a plurality of display elements. In a first mode of operation, the display state of substantially all the display elements is periodically re-set so as to display a first series of image frames. Upon changing to a second mode of operation, a second mode of operations comprises re-setting the display state of only a first portion of the display elements so as to display a second series of image frames at a display element resolution which is less than said display element resolution used to display said first series of image frames. The reduced display element resolution may reduce the color gamut of the display. In one embodiment, the display state of the remaining portion of the display elements is re-set at a rate that is lower than the rate of re-setting the first portion.

The following detailed description is directed to certain specific embodiments of the invention. However, the invention can be embodied in a multitude of different ways. In this description, reference is made to the drawings wherein like parts are designated with like numerals throughout. As will be apparent from the following description, the invention may be implemented in any device that is configured to display an image, whether in motion (e.g., video) or stationary (e.g., still image), and whether textual or pictorial. More particularly, it is contemplated that the invention may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Figure 1:
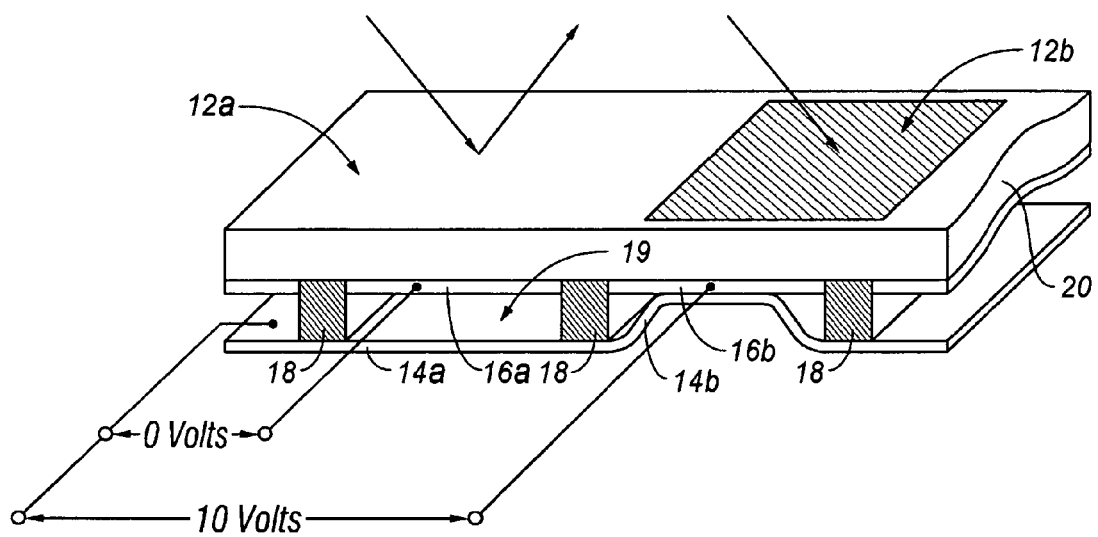
FIG. 1 is an isometric view depicting a portion of one embodiment of an interferometric modulator display in which a movable reflective layer of a first interferometric modulator is in a released position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the released state, the movable layer is positioned at a relatively large distance from a fixed partially reflective layer. In the second position, the movable layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable and highly reflective layer 14a is illustrated in a released position at a predetermined distance from a fixed partially reflective layer 16a. In the interferometric modulator 12b on the right, the movable highly reflective layer 14b is illustrated in an actuated position adjacent to the fixed partially reflective layer 16b.

The fixed layers 16a, 16b are electrically conductive, partially transparent and partially reflective, and may be fabricated, for example, by depositing one or more layers each of chromium and indium-tin-oxide onto a transparent substrate 20. The layers are patterned into parallel strips, and may form row electrodes in a display device as described further below. The movable layers 14a, 14b may be formed as a series of parallel strips of a deposited metal layer or layers (orthogonal to the row electrodes 16a, 16b) deposited on top of posts 18 and an intervening sacrificial material deposited between the posts 18. When the sacrificial material is etched away, the deformable metal layers are separated from the fixed metal layers by a defined air gap 19. A highly conductive and reflective material such as aluminum may be used for the deformable layers, and these strips may form column electrodes in a display device.

With no applied voltage, the cavity 19 remains between the layers 14a, 16a and the deformable layer is in a mechanically relaxed state as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable layer is deformed and is forced against the fixed layer (a dielectric material which is not illustrated in this Figure may be deposited on the fixed layer to prevent shorting and control the separation distance) as illustrated by the pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

Figure 2:
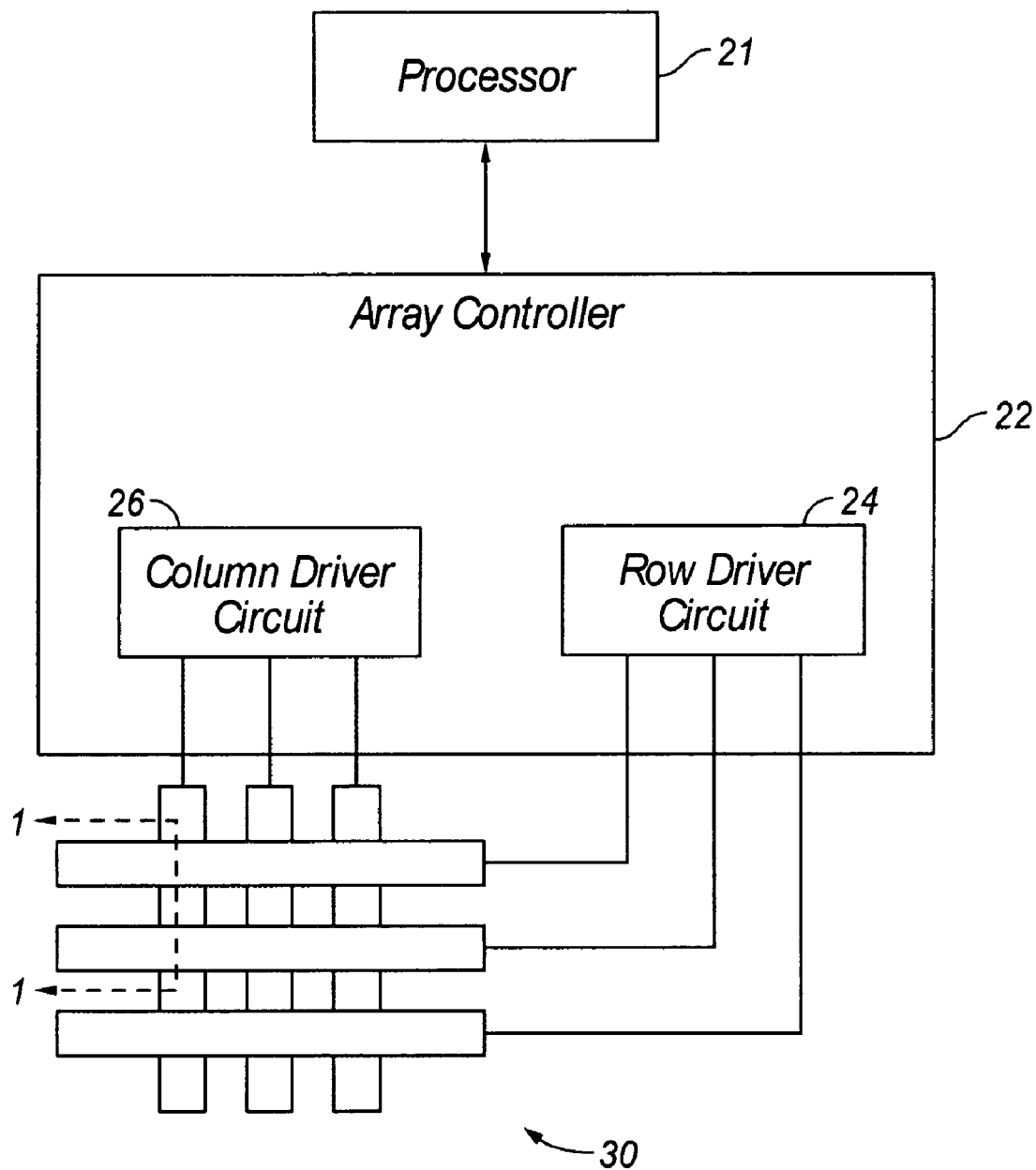
FIG. 2 is a system block diagram illustrating one embodiment of an electronic device incorporating a 3×3 interferometric modulator display.

FIGS. 2 through 5 illustrate one exemplary process and system for using an array of interferometric modulators in a display application. FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array controller 22. In one embodiment, the array controller 22 includes a row driver circuit 24 and a column driver circuit 26 that provide signals to a pixel array 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the released state to the actuated state. However, when the voltage is reduced from that value, the movable layer maintains its state as the voltage drops back below 10 volts. In the exemplary embodiment of FIG. 3, the movable layer does not release completely until the voltage drops below 2 volts. There is thus a range of voltage, about 3 to 7 V in the example illustrated in FIG. 3, where there exists a window of applied voltage within which the device is stable in either the released or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be released are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or released pre-existing state. Since each pixel of the interferometric modulator, whether in the actuated or released state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
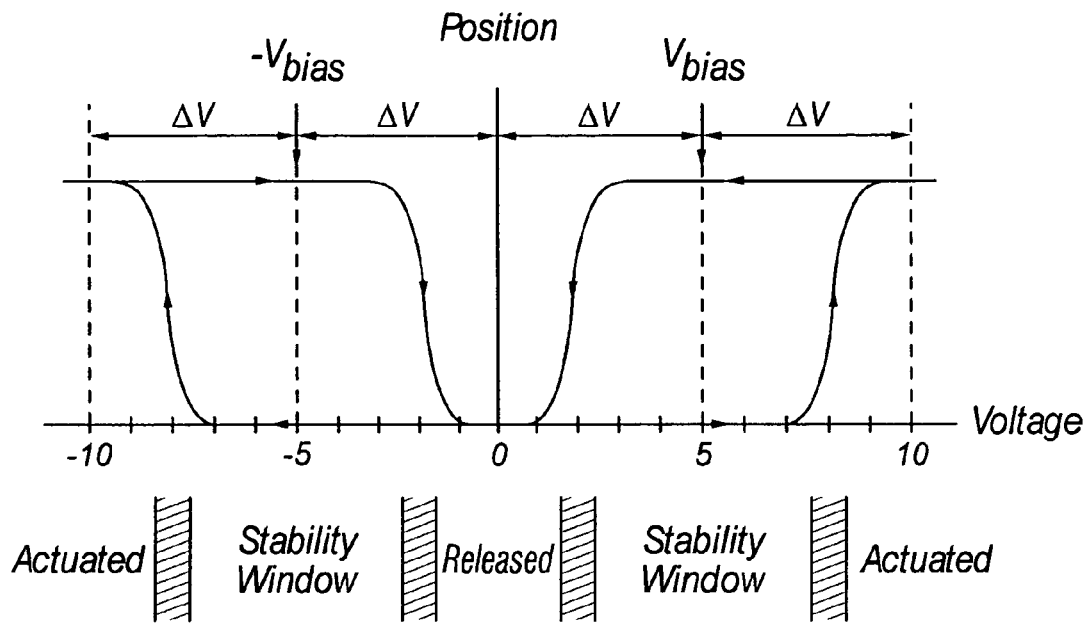
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel can involve setting the appropriate column to $-V_{bias}$, and the appropriate row to $+\Delta V$, which may correspond to −5 volts and +5 volts respectively. Releasing the pixel can be accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$ or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
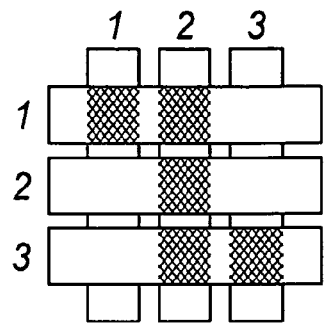
FIGS. 5A and 5B illustrate one exemplary timing diagram for row and column signals that may be used to write a frame of display data to the 3×3 interferometric modulator display of FIG. 2.
Figure 5B:
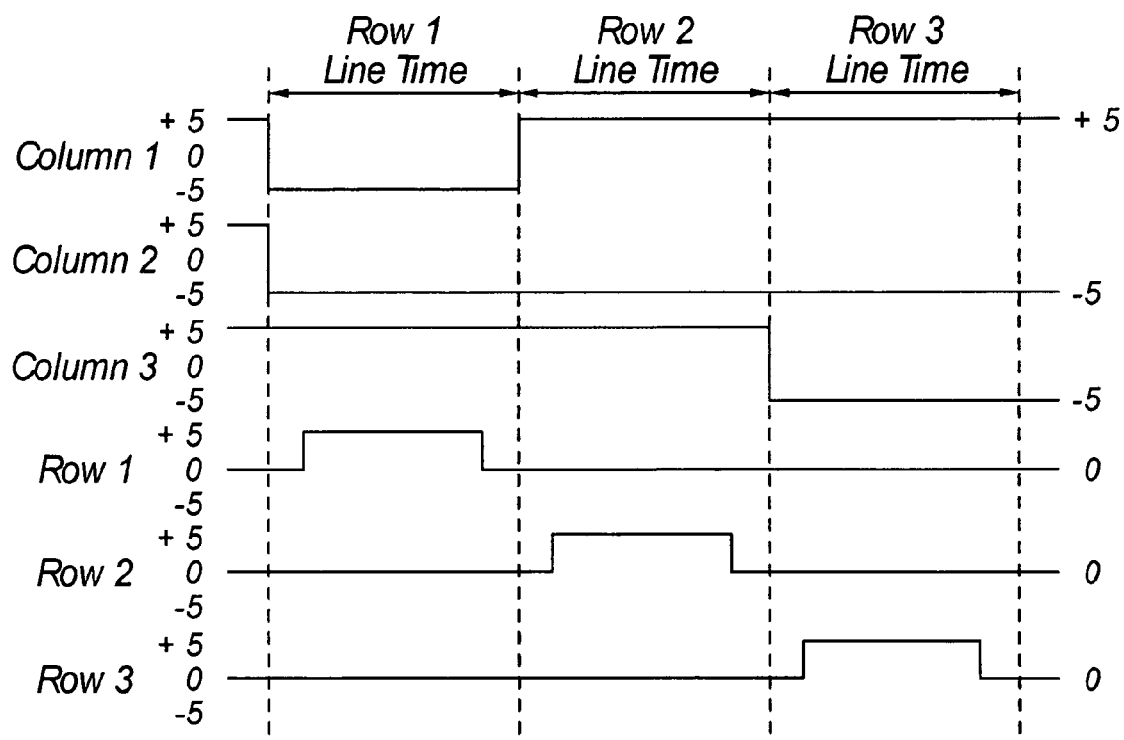

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or released states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and releases the (1,3) pixel. No other pixels in the array are affected. To configure row 2 as desired, column 2 is set to −5 volts, and columns 1 and 3 are set to +5 volts. The same strobe applied to row 2 will then actuate pixel (2,2) and release pixels (2,1) and (2,3). Again, no other pixels of the array are affected. Row 3 is similarly configured by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the present invention.

Figure 6A:
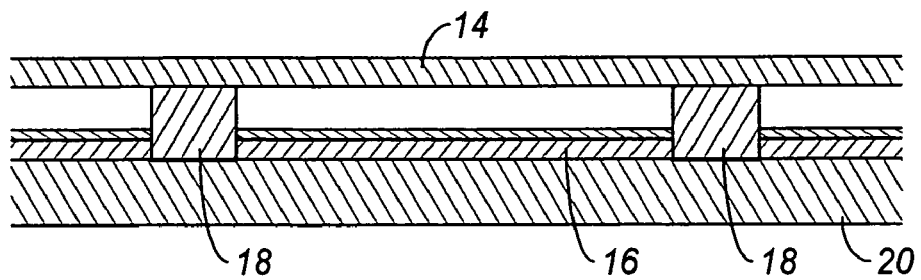
FIG. 6A is a cross section of the device of FIG. 1.
Figure 6B:
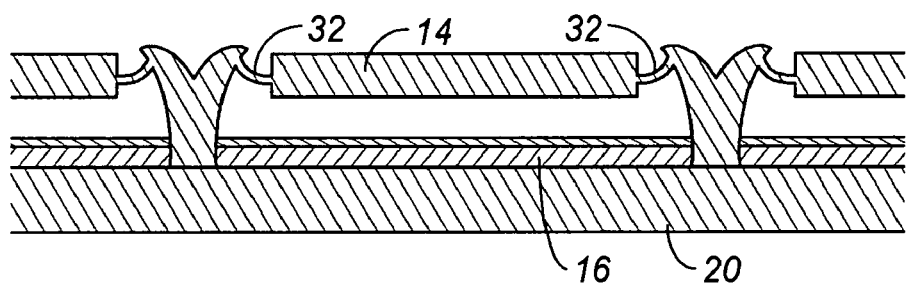
FIG. 6B is a cross section of an alternative embodiment of an interferometric modulator.
Figure 6C:
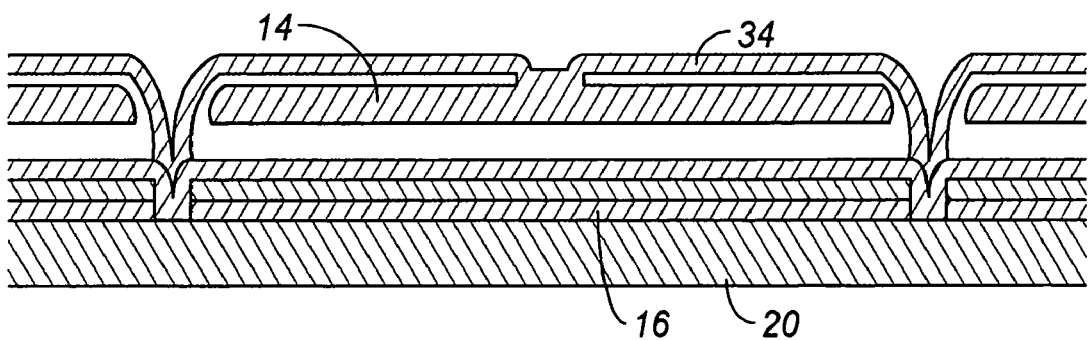
FIG. 6C is a cross section of another alternative embodiment of an interferometric modulator.

The details of the structure of interferometric modulators that operate in accordance with the principles set forth above may vary widely. For example, FIGS. 6A-6C illustrate three different embodiments of the moving mirror structure. FIG. 6A is a cross section of the embodiment of FIG. 1, where a strip of metal material 14 is deposited on orthogonally extending supports 18. In FIG. 6B, the moveable reflective material 14 is attached to supports at the corners only, on tethers 32. In FIG. 6C, the moveable reflective material 14 is suspended from a deformable layer 34. This embodiment has benefits because the structural design and materials used for the reflective material 14 can be optimized with respect to the optical properties, and the structural design and materials used for the deformable layer 34 can be optimized with respect to desired mechanical properties. The production of various types of interferometric devices is described in a variety of published documents, including, for example, U.S. Published Application 2004/0051929. A wide variety of well known techniques may be used to produce the above described structures involving a series of material deposition, patterning, and etching steps.

Data describing a monochrome display image may include one bit of data per pixel. One embodiment of a monochrome display includes one interferometric modulator per pixel, the on or off state of the modulator being set based on the value of the one bit of data per pixel. A greyscale image may include several bits of data per pixel. For example, a "3 bit" greyscale display includes 3 bits of data per pixel that correspond to one of eight shades of gray that may be assigned to each pixel. One embodiment of a display for displaying an exemplary 3 bit grayscale image includes three interferometric modulators for each pixel. To obtain the eight shades, the three modulators reflect light according to a ratio of 1:2:4. In one such embodiment, each of the interferometric modulators includes mirrors having a reflective surface area that varies according to the ratio of 1:2:4. A particular shade in a pixel is obtained in such an embodiment by setting each modulator to an on or off state based on the binary value of a corresponding bit of the 3 bits of data. One embodiment of a color display works similarly except that the color display includes a group of red, green, and blue interferometric modulators. For example, in a 12-bit color display, 4 of the 12 bits correspond to each of 16 intensities of red, green, and blue which are produced by red, green, or blue interferometric modulators. Such greyscale or color displays thus have more display elements to address than does a monochrome display.

As discussed briefly above, power consumption in an interferometric modulator display is a function of changing the state of the interferometric modulator display elements in the display. Thus, power consumption of such a display can be varied by changing the frequency of updates of the display elements. In addition, color or greyscale interferometric modulator displays that have pixels, or rows of pixels subdivided into sets of interferometric modulators, tend to have increased power consumption as compared to monochrome displays because of the increased number of interferometric modulators in such displays.

One way of reducing power consumption in an interferometric display is to reduce the frequency of updates of the display elements in the display. In particular, it has been found that in a greyscale or color display, the display elements corresponding to the least significant bits of greyscale or color shade data can be updated at a lower rate than the remaining display elements to reduce power consumption of the display.

Figure 7:
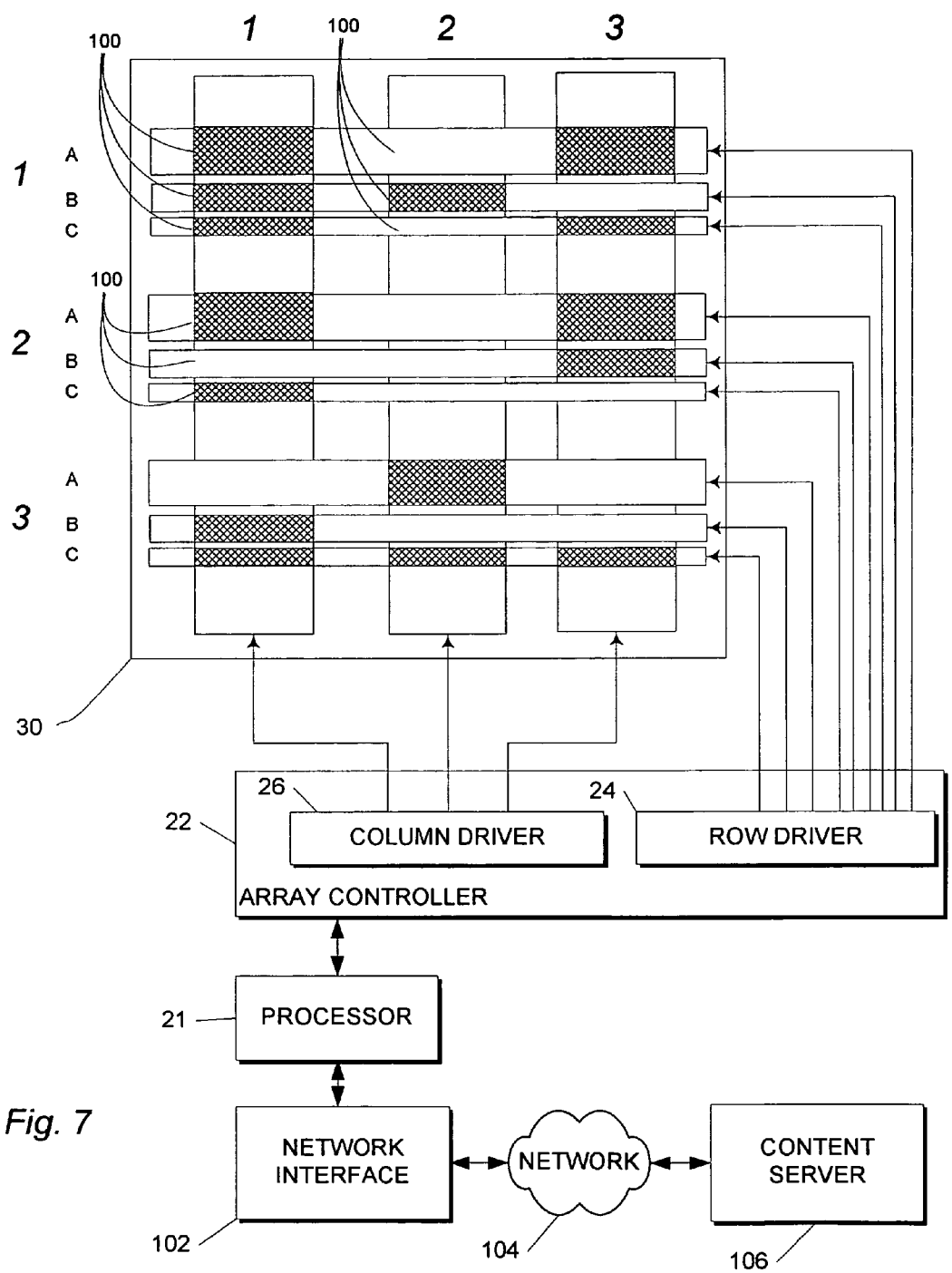
FIG. 7 is a partial system block diagram of an exemplary interferometric modulator display, similar to that illustrated in FIG. 2.

FIG. 7 is a partial schematic diagram of an exemplary interferometric modulator display, similar to that shown in FIG. 2. In the embodiment of FIG. 7, each of the rows of the pixel array 30 is subdivided into three subrows, A, B, and C. Each of the subrows defines one interferometric modulator display element 100 at each column. The subrows are each connected to the row driver 24. As compared to FIG. 2, the row driver 24 thus includes additional connections to the subrows to drive the color or greyscale pixel array 30. In FIG. 7, the display elements 100 are each illustrated in exemplary reflecting (white) or absorbing (hashed) states.

In the embodiment of FIG. 7, the processor 21 is in communication with a network interface 102 that communicates over a network 104 with a content server 106. The network interface 102 may support communication over any suitable data communications network. In one embodiment, the network interface 102 is a cellular radio transceiver that supports a code division multiple access (CDMA), or other wireless voice and/or data communications protocol such as time division multiple access (TDMA), frequency division multiple access (FDMA), or Global System for Mobile Communications (GSM). In other embodiments, the network interface 102 may support one or more additional, or alternative, radio interface protocols such as Bluetooth, IEEE 802.11, or other wireless protocols. In one embodiment, the network interface 102 supports a wired data interface, such as Ethernet, a serial port, a universal serial bus (USB) port, Firewire, IEEE 1394, a synchronization cradle coupled to a network or other computing device, or an interface to a GPS receiver.

The network 104 may include an Internet Protocol (IP) network, wireless networks, or any other suitable data communications network. The content server 106 may include any suitable computer system configured to transmit image data, including motion picture data in any format suitable for transmission over the network 106.

In one embodiment, the array controller 22 controls the rate of update of the display elements 100. The processor 21 may configure the refresh rate of the array controller 22. In one embodiment, the array controller is configured to operate in two or more modes of update. In one mode, each of the rows of the pixel array 30 is updated using a method such as described above with reference to FIG. 5B. In a second mode, at least one of the subrows is updated at a lower frequency. For example, in one embodiment, in the second mode, subrows A and B are updated 30 times a second and the remaining rows, e.g., subrow C is updated only once a second. Thus, power consumption is reduced with the tradeoff of lower color resolution and, thus, color gamut in the second mode. In another embodiment, the lower frequency of updating the remaining rows, e.g., row C, is very low, e.g., only when the display is initialized, or when the mode changes.

In one embodiment, the array controller 22 is configured to update the rows and subrows of display elements 100 by applying a series of row voltage strobes to each subrow to configure the state of the subrow. In one embodiment, in the second mode, the array controller 22 is configured to skip row voltage strobes for some of the subrows. For example, in one embodiment, in the first mode, the array controller 22 applies a series of row voltage strobes to each of the subrows A, B, and C of each row. When switched to the second mode, the array control 22 applies the row voltage strobes to subrows A and B of each row but skips subrow C. In one embodiment, as available battery power becomes lower, the array controller 22 skips more subrows, for example, by applying row voltage strobes to subrows A but skipping subrows B and C of each of the rows. In one embodiment, the array controller 22 applies a series of row voltage strobes to configure the states the non-updated subrows to a selected state, e.g., non-reflecting, upon entering the second mode. In one embodiment, the array controller 22 maintains the non-updated subrows in the selected state by applying a bias voltage across the display elements 100 of such subrows. In another embodiment, the array controller 22 periodically applies row voltage strobes to the otherwise non-updated subrows in the second mode to configure the state of the display elements 100 in such subrows to a new selected state. For example, the array controller 22 periodically fails to skip the subrows C and updates the display elements 100 in the subrows C to a new selected state. This periodic application of row voltage strobes to the otherwise non-updated subrows may be at a frequency much lower than the frequency of application of row voltage strobes to the other subrows. In one embodiment, the lower frequency period is non-constant. In one embodiment, the lower frequency period is based on image data and varies based on the image data.

In one embodiment, the display elements 100 of the subrows that are updated at the lower frequency, e.g., row C in the exemplary embodiment, are all set to the same state. In one such embodiment, the display elements of the less frequently updated subrows are set to a non-reflecting state. In another embodiment, the less frequently updated subrows are set to display an overall average visual shade of grey or color that may, for example, be based on an average brightness or color for some or all display elements 100 calculated over one or more image frame or frame portions.

In another embodiment, the display state of the less frequently updated subrows of display elements is based on particular portions of the image data stream. For example, motion video data, e.g., MPEG data, comprises reference frames describing all pixels that are sent relatively infrequently and intervening data frames that update only a portion of the pixels in the video image. In one embodiment, the less frequently updated subrows may be updated only when reference frames are displayed, and may be held at a particular state until the next reference frame is received. The particular state may be a calculated state, as described above, or the actual state for the less frequently updated display elements 100 in the reference state.

In one embodiment, additional modes may include updating a different number of subrows at different frequencies. For example, in one embodiment, in a first mode each of subrows A, B, and C is updated at a first rate; in a second mode, subrow A and B are updated at a first rate and subrow C at a lower rate, or at varying rate, such as described above based on receiving video reference data frames; and in a third mode, subrow A is updated at a first rate, subrow B at a second rate, and subrow C at a third rate. It is to be recognized that in embodiments with more subrows, additional modes of operation may be defined to have varying power consumption properties.

In one embodiment, the array controller 22 changes the display mode when available power level conditions, such as from a battery (not shown) providing power to the array 30, fall below a threshold level, or satisfy other predetermined conditions. In one embodiment, the processor 21 determines when to change display mode and signals the array controller 22 to change operational mode. In another embodiment, a user of an electronic device that contains the pixel array 30 may trigger the change to a different mode manually, or may configure the device to switch between modes under predetermined conditions.

In is to be recognized that while certain embodiments are discussed herein with respect to reducing display resolution by skipping row strobes, in other embodiments, updates of particular columns may be skipped to reduce power consumption. For example, in one such embodiment, rather than transitioning column voltages as image data for a given column changes from row to row, the voltage applied to some columns may be held at a potential that maintains the display elements of the skipped columns in an actuated or released state. In the embodiment of FIG. 5, for example, the columns in which column transitions are skipped can be held at a constant 0 V-5 V to remain released during frame updates, or at a constant 10 V-15 V to remain activated during frame updates.

In one embodiment, the image data being displayed by the display array 30 includes data being received over the network 104 from the content server 106. In one embodiment, the processor 21 communicates data describing the current display mode being used by the array controller to the content server 106. The content server 106 may thus filter the image data so that the image data for non-updated display elements is not sent. Thus, the total bandwidth consumed by the communicated data signal is reduced in proportion to the number of display elements that are not being updated at the fastest display rate. This reduction in data rate may further reduce power consumption associated with the display as the network interface 102 and the processor 21 have less data to process. In one embodiment, the content server 106 may determine the state, shade, or color for the less frequently updated subrows to display between updates and communicate that state to the processor 21.

In addition to varying the data rate based on the operational mode of the display, the content server 106 may also control or select the operational mode of the array 30. For example, based on information available to the content server 106 such as operational or power data associated with the display array 30 or controller 22, the content server 106 may send control data to the processor 21 for selecting the operational mode of the array 30. The content server 106 may also select the operational mode based on other data such as stored user preferences, rules associated with the content, or the desired rate of transfer of data on the network 104.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A method of updating a display, said display comprising a plurality of display elements characterized by a display state, said method comprising:
   in a first mode of operation, periodically re-setting said display state of substantially all said display elements at a first frame update rate so as to display a first series of image frames, said plurality of display elements being arranged as a plurality of pixels of said display, each pixel having two or more display elements; and
   changing to a second mode of operation, wherein said second mode of operation comprises periodically re-setting said display state of a first portion of said display elements at a second frame update rate and periodically re-setting said display state of a remaining portion of said display elements at a third frame update rate that is less than said second frame update rate, said changing being triggered by a power level condition,
   wherein in said second mode, a second series of image frames are displayed at a display element resolution which is less than said display element resolution used to display said first series of image frames, and
   wherein said second mode comprises periodically re-setting said display state of a first display element in a first pixel at said second frame update rate and periodically re-setting said display state of a second display element in said first pixel at said third frame update rate.

2. The method of claim 1, wherein said first frame update rate is the same as said second frame update rate.

3. The method of claim 1, wherein said third frame update rate is varied over time.

4. The method of claim 1, wherein said third frame update rate is varied based at least in part on said second series of image frames.

5. The method of claim 1, wherein periodically re-setting said display state of said remaining portion of said display elements comprises determining said display state based at least in part on at least one of said second series of image frames.

6. The method of claim 1, wherein said changing to said second mode of operation comprises re-setting said display state of said remaining portion of said display elements.

7. The method of claim 1, wherein said second mode of operation consumes less power than said first mode.

8. The method of claim 1, wherein said second mode of operation is utilized under low battery conditions.

9. The method of claim 1, wherein said second mode of operation is utilized for displaying motion picture data.

10. The method of claim 1, wherein said second mode of operation displays a reduced color gamut as compared to said first mode of operation.

11. The method of claim 1, wherein said second mode of operation displays a reduced gray scale as compared to said first mode of operation.

12. The method of claim 1, wherein said plurality of display elements comprises a MEMS array arranged in rows and columns and wherein said remaining portion comprises a selected subset of the columns.

13. The method of claim 1, wherein said plurality of display elements comprises a MEMS array of rows and columns and wherein said remaining portion comprises a selected subset of the rows.

* * * * *